United States Patent [19]
Sigdell et al.

[11] 3,919,455
[45] Nov. 11, 1975

[54] APPARATUS FOR THE MEASUREMENT OF THE VOLUME AND FLOW RATE OF LIQUIDS

[75] Inventors: Jan-Erik Sigdell; Martin Buser, both of Basel, Switzerland

[73] Assignee: Hoffmann-La Roche Inc., Nutley, N.J.

[22] Filed: July 22, 1974

[21] Appl. No.: 490,465

Related U.S. Application Data

[63] Continuation of Ser. No. 307,249, Nov. 16, 1972, abandoned.

[30] Foreign Application Priority Data
Oct. 20, 1972 Switzerland.................... 15418/72

[52] U.S. Cl.................... 73/226; 73/194 R
[51] Int. Cl.² .................................. G01F 3/38
[58] Field of Search ............. 73/223, 226, 290, 304; 137/123, 132, 141; 222/204, 416; 340/244 R

[56] References Cited
UNITED STATES PATENTS

| 2,391,006 | 12/1945 | Bryce et al.............. | 137/132 X |
| 3,115,038 | 12/1963 | Babson.................... | 73/223 |
| 3,234,784 | 2/1966 | Wiegmann................ | 73/223 X |
| 3,534,606 | 10/1970 | Stamler.................... | 73/304 C |
| 3,641,818 | 2/1972 | Ern......................... | 73/226 |

FOREIGN PATENTS OR APPLICATIONS
399,852  7/1924  Germany ......................... 73/226

OTHER PUBLICATIONS
J. C. Ingles et al., An accurate Flow-Integrating Device for Hydromettallurgical Studies, The Review of Scientific Instruments, July 1953, p. 542.
W. R. S. Briggs et al., A Photoelectric Flow Rate Meter, Journal of Scientific Instruments, July 1954, p. 249.

*Primary Examiner*—Richard C. Queisser
*Assistant Examiner*—John P. Beauchamp
*Attorney, Agent, or Firm*—Samuel L. Welt; Bernard S. Leon; Mark L. Hopkins

[57] ABSTRACT

An apparatus for the measurement of the volume and flow rate of a flowing liquid which comprises a syphon adapted to operate on the syphon-suction principle having a container for the collection of the flowing liquid, and a discharge conduit connected to said container in a manner such that upon a previously determined liquid level being reached, a predetermined volume of liquid is automatically discharged from the container, said apparatus being equipped with an optical and/or electrical sensor for the detection of the liquid level and/or the discharge.

1 Claim, 4 Drawing Figures

APPARATUS FOR THE MEASUREMENT OF THE VOLUME AND FLOW RATE OF LIQUIDS

This is a continuation of application Ser. No. 307,249 filed Nov. 16, 1972, now abandoned.

BACKGROUND OF THE INVENTION

This invention is concerned with an apparatus for the measurement of the volume and flow rate of a flowing liquid which is particularly suitable for the measurement of small flow rates and may conveniently be used for the supervision of the urinary discharge of patients in intensive care units.

The continuous measurement of a small flow rate is more difficult than the corresponding determination when the flow rate is higher and must accordingly be approached in a different manner especially when the measuring instrument should present little resistance to the liquid flow. In such cases it is advantageous to divide the liquid flow into suitable volume increments $\Delta V$ and then to measure the time elapsing between the filling of the volume increments, or to count the number of volume increments flowing within a given time. Instruments are already known which operate according to this principle, such as the device in which a container having a volume space $\Delta V$ is alternately filled and emptied through valves, whereby the valves are controlled by a fluid level meter. Another device operates by a tiltable container which is filled with the flowing liquid and is tilted by the weight of the liquid when a volume $\Delta V$ has run into the container, thereby discharging its contents.

These two known devices are relatively costly to operate and in particular suffer from the disadvantage that they contain moving parts which are subject to wear. The second of the apparatuses mentioned above is very sensitive to movement and vibration and is also dependent on the specific gravity of the liquid involved.

It is an object of the present invention to overcome the disadvantages mentioned above.

BRIEF SUMMARY OF THE INVENTION

According to the present invention there is provided an apparatus for the measurement of the volume and flow rate of a flowing liquid which comprises a syphon adapted to operate on the syphon-suction principle having a container for the collection of the flowing liquid, and a discharge conduit connected to said container in a manner such that upon a previously determined liquid level being reached, a predetermined volume of liquid is automatically discharged from the container, said apparatus being equipped with an optical and/or electrical sensor for the detection of the liquid level and/or the discharge.

The apparatus for the determination of the liquid level can also be so constructed that the increase in the volume of liquid in the container can be measured continuously between two discharges.

DESCRIPTION OF PREFERRED EMBODIMENTS

Figure 1:
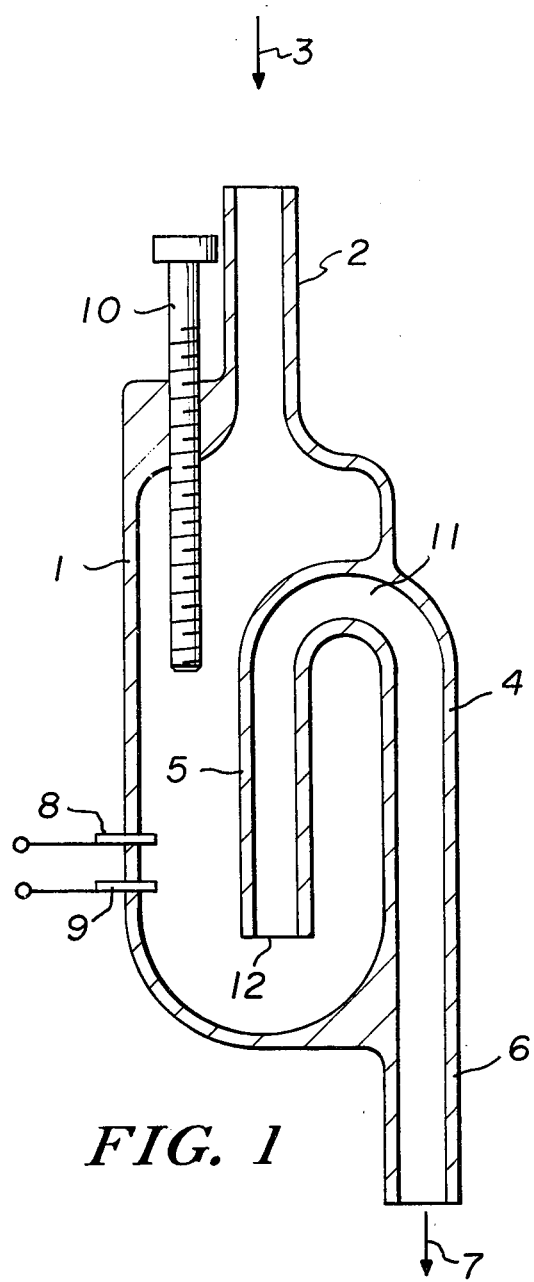
Figure 3:
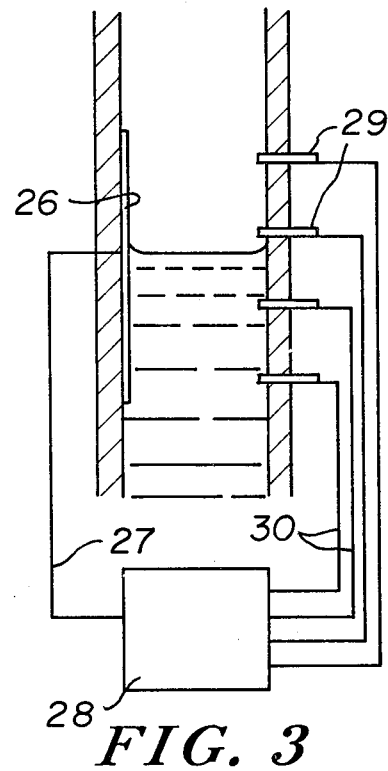
Figure 4:
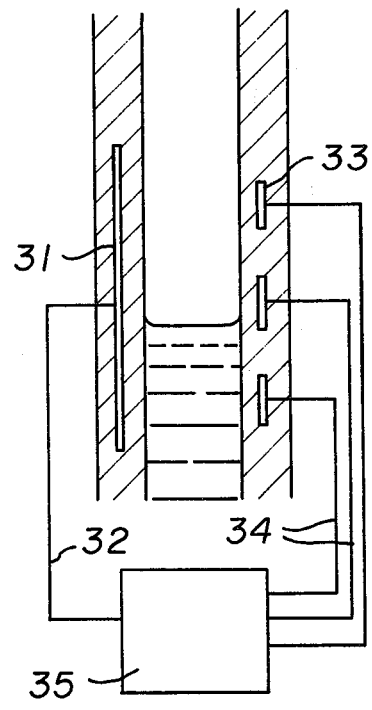
Figure 2:
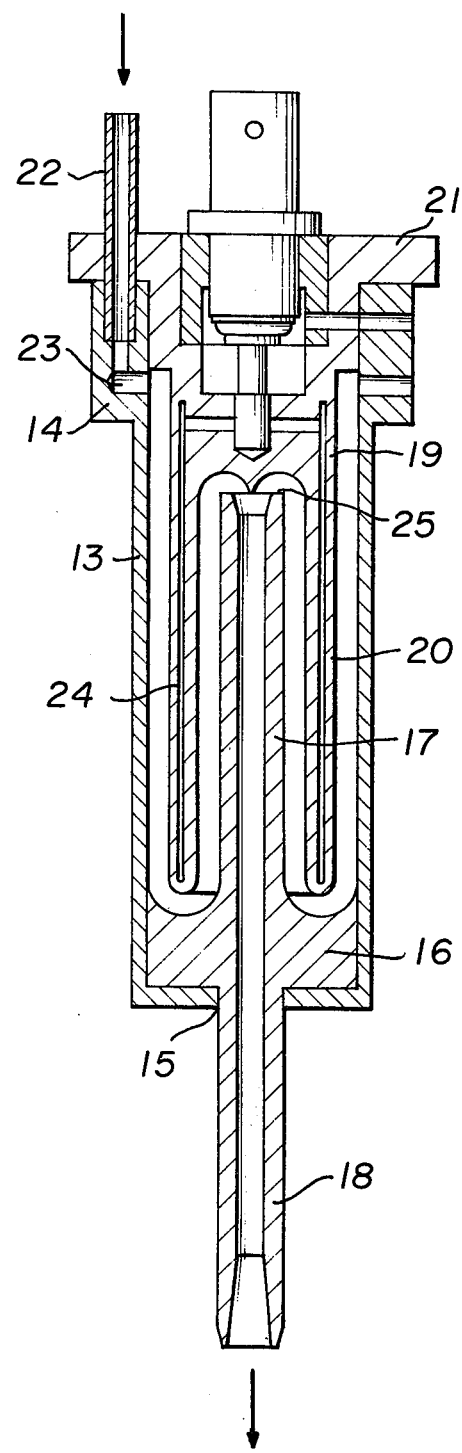

A preferred embodiment of the invention will now be described below with particular reference to the accompanying drawings. In the drawings:

FIG. 1 shows a cross section through one embodiment according to the present invention, FIG. 2 shows a cross section through another, concentric embodiment of the invention with a sensor for the continuous determination of the liquid level, FIG. 3, shows a schematic representation of a sensor for the electrical measurement of the liquid level where the liquid being measured is electrically conductive and FIG. 4 shows a schematic representation of a sensor for the electrical determination of a liquid level in the case where the liquid may be either conductive or nonconductive.

The apparatus shown in section in FIG. 1 consists of a substantially cylindrical container 1 which is closed at its lower end and whose upper end is in the form of an inlet tube 2 which is adapted to be connected to the feed pipe or tubing for the liquid. The inlet 2 forms the entrance to the apparatus through which the liquid flows in the direction of the arrow 3. At one point in the cylindrical housing a U-shaped bent tube 4, having two legs 5, 6 of unequal length is situated whereby the openings of the two legs are directed in a downwards direction, the said U-shaped tube being of unitary construction with the cylindrical housing. The shorter leg, 5, lies concentrically in the container 1 and has its aperture towards the lower end of the container. The longer leg 6, passes outside the container 1 and has its mouth situated below the bottom of the container. The mouth of the tube 6 forms the exit of the apparatus through which the discharged liquid flows in the direction of the arrow 7.

On the opposite side from the tube 4 of the container 1 are placed two electrodes 8, 9 spaced apart from each other in the wall of the container 1, to which is attached a conventional measuring device for the measurement of an electric current flowing between the two electrodes. In the upper part of the housing adjacent the inlet tube 2, a threaded opening is situated having an elongated threaded bolt 10 therein. This bolt serves to allow fine adjustments to be made to the volume of the container 1. The volume of the housing may be increased or decreased by screwing the bolt out or in respectively.

The apparatus described above is only suitable for use with electrically conductive liquid. The liquid whose flow rate is being measured flows in the direction of the arrow 3 through the inlet tube 2 into the container 1 and collects there until the liquid level has reached the electrode 8 thereby allowing a current to flow between the electrodes 8 and 9 thereby indicating that the filling process is under way. The liquid continues to rise until it reaches the topmost point 11 of the U-shaped tube. Once the liquid reaches the topmost point 11 of the U-shaped tube, liquid is discharged from the container 1 through the leg 6 until the level of the liquid has sunk to the level of the mouth 12 of the leg 5. As soon as the discharge process is so advanced that the liquid level has sunk below the electrode 8, the electric connection between the electrodes 8 and 9 is broken. After the discharge filling may commence once more.

By means of the alternate filling and discharge of the container 1 the flow of liquid is divided into volume increments $\Delta V$. For each filling and evacuation an electric impulse is generated between the electrodes 8, 9 by means of which the number of volume increments $\Delta V$ is counted. In this manner the flow rate can be measured by counting the number of volume increments in a given time.

FIG. 2 shows a further embodiment of the invention according to which a continuous measurement of the liquid level is envisaged and which is concentrically constructed. The apparatus is in the form of a substantially cylindrical housing 13 whose upper end is in the shape of a thickened flange 14 and whose lower end is flat and has an opening 15 therein. Concentrically situated in the housing 13 are two interlocking inserts 16 and 19. The lower insert 16 is essentially constructed in the form of a tube with an upper half 17 projecting inside the housing and a lower half 18 which projects downwardly through the opening 15 which forms the exit of the apparatus. Between the two tubular halves 17 and 18 the insert 16 has a radially disposed extension the outer diamter of which corresponds to the internal diameter of housing 13, and the upper surface of which is in the form of an annular grove which also constitutes the floor of the interior part of the container.

The lower portion of the insert 19 is also tubular in shape whereby the diameter of the tubular portion is equidistant between the diameter of the housing 13 and the diameter of the upper tubular portion 17 of the lower insert 16. In this manner an annular channel is formed between the wall of the housing 13 and the tubular part 20 of the upper insert 19 and between the latter and the tubular part 17 of the lower insert 16. The length of the tubular part 20 of the upper insert 19 and the tubular part 17 of the lower insert 16 are so shaped with respect to each other that the two circular channels are connected and that the inner circular channel is connected with the bore of insert 16.

The upper part of the insert 19 is enlarged stepwise so as to correspond to the inside diameter of the housing 13 and finally formed into a flange through a further enlargement 21. The upper part of the insert 19 has a concentric depression which is adapted to receive the connections of the electrical measuring device which will be further described below.

In the flange-shaped thickening 14 of housing 13 there is a bore 23 having a 90° bend situated therein one end of the horizontal leg of which opens into the interior of the housing and the vertical leg of which leads upwardly in an inlet tube 22 which passes through flange 21 and which serves as a conduit through which the liquid is lead into the apparatus. On the other side of the thickening 14 from the bore 23 is situated a bore which connects the inside of the housing with the atmosphere in order to ensure the correct functioning of the apparatus.

The meter for measuring the level of the liquid in the housing 13 consists substantially in two condenser plates which are concentrically disposed with respect to each other, one of the condenser plates being constituted by the housing 13 itself. For this reason the housing 13 must either be made of metal or must have a metallic coating on its inner side. The second condenser plate is formed from a metal cylinder 24 fitted inside the upper insert 19 and extending over the entire length of the circular channel 20 of the insert 19. In the already mentioned depression in the upper portion of the insert 19 there is a socket 36 for a twin core, preferably shielded, electric cable. One contact of the socket is connected with the metal cylinder 24 and the other with the housing 13.

In operation this apparatus functions in the same manner as the apparatus shown in FIG. 1 that is, according to the syphon principle the liquid fills the inside of the housing 13 until it reaches the topmost point 25 of the syphon, whereupon the apparatus automatically discharges. As the liquid level in the container rises so the capacitance between the housing 13 and the inner metal cylinder 24 changes. According to a known electrical measuring device the alteration in capacitance can, for example be measured in such a way that the increase in volume of the container can be determined and hence also the flow rate between two discharges estimated. In addition, the discharges can be counted, thus facilitating a continuous measurement of the flow rate and volume.

Both forms of the apparatus may be relatively simply manufactured. The embodiment of the invention shown in FIG. 1 can be very cheaply prepared from two plastic half-shells. The embodiment shown in figure two can also for the most part be made from plastics. The outside of the housing consists, however, as stated above, of metal, for example of aluminium.

In FIG. 3 there is shown an apparatus for the measurement of the liquid level in schematic form. This apparatus is however only for use with electrically conductive liquids. An elongated electrical conductor 26 is disposed against one of the walls of the inside of the apparatus parallel to the axis of the apparatus. The conductor 26 is connected via a lead 27 to a meter 28 shown in block form. A series of individual electrodes 29 are disposed against a wall of the apparatus, preferably opposite conductor 26. The electrodes 29 are connected via leads 30 to the meter 28. As the level of the liquid rises the electrodes 29 are connected one after the other to the electrode 26 through the conducting liquid. By means of the meter 28 the level of the liquid can, with the assistance of the corresponding signals, be measured.

In FIG. 4 there is shown an apparatus which can also be used for the stepwise determination of the level of a liquid in a syphon apparatus. This apparatus is, however, also capable of being used with non-conductive liquids and in situations where an exposed electrode may not be used. Condenser plates are disposed in the walls of the apparatus facing each other. Plate 31 is disposed in the direction of the axis of the apparatus and extends over the entire length of the maximum difference in height of the liquid in the housing. In the opposite wall are disposed small plates 33 at predetermined distances from each other. The plate 31 and the plates 33 are each respectively connected through leads 32 and 34 to a conventional capacitance meter 35. Each plate 33 forms, together with the plate 31, a condenser whose capacity changes as the space between the plates is filled by the rising liquid thereby providing a signal which corresponds to the level of the liquid.

Measurement of the level of the liquid in the syphon container can also be effected optically and for this purpose the entire apparatus, or portions of the apparatus opposite to each other may be prepared from transparent material. A beam of light emanating from a light source is directed against the apparatus so as to form an angle of less than 90° with the surface of the liquid column. In this way the difference between the refractive indices between the liquid and air operate so as to alter the path of the beam of light when the container is full as compared to when it is empty. On the other side of the apparatus a photoelectric cell, or a similar light-sensitive device is placed in such a manner as to receive the beam of light when the container is full but not when the container is empty. The so-generated electrical signal may again be used either to measure the level of the liquid or to count the number of times the apparatus discharges itself.

When it is only intended to count the number of discharges the measuring device need simply be connected to the exit tube 6 or 18. Since the liquid flows relatively quickly on discharge a sharp signal will be generated. The meter used in this case corresponds to the above-described device for electric or optical measurement.

It should be understood, of course, that the foregoing disclosure relates to only preferred embodiments of the invention and that many other embodiments might be found to be suitable. An alternative possibility for the optical measurement of the liquid level or the discharges is offered by utilizing the effects of scattering, attenuating or defocussing of a light beam instead of its deflection in order to detect the presence or absence of the liquid in the container.

We claim:

1. In apparatus for the measurement of the volume and flow rate of a flowing liquid which includes a syphon arrangement adapted to operate on the syphon-suction principle, a container for the collection and discharge of the flowing liquid and a discharge orifice, the arrangement comprising a housing being open at one end and having a reduced opening at the other end thereof, and first and second closely cooperating members of cylindrical symmetry securely received within said housing, said first member being formed of a central portion with first and second extensions thereto of narrower cross-section, defining with said central portion a conduit through said first member along the longitudinal axis thereof, said conduit having first and second orifices at the respective free ends of said extensions, the first extension of said first member protruding through the reduced opening of said housing to define said discharge orifice, said second member of cylindrical symmetry being substantially in the form of a hollow cylinder opened at one end for receiving into the interior thereof the second extension of said first member, the shape of said first and second cooperating members and the arrangement thereof within said housing being such as to define from the open end of said housing to said discharge orifice a continuous path for liquid flow which includes said syphon arrangement and said container, said apparatus further comprising sensing means predeterminably arranged relative to said continuous path for detecting the presence of liquid, said container having an electrically conducting wall forming a first element of a capacitor device for measuring the liquid level in the container and one of said members of cylindrical symmetry containing an electrically conducting layer forming a second element of said capacitor device.

* * * * *